United States Patent
Zeng et al.

(10) Patent No.: US 12,091,971 B2
(45) Date of Patent: Sep. 17, 2024

(54) TRACER DIFFUSION DEVICE, SYSTEM FOR TRACING DEVELOPMENT OF WATER CONDUCTING FRACTURE ZONE AND RELATAED METHOD

(71) Applicant: CHINA UNIVERSITY OF MINING AND TECHNOLOGY, BEIJING, Beijing (CN)

(72) Inventors: Yifan Zeng, Beijing (CN); Shihao Meng, Beijing (CN); Qiang Wu, Beijing (CN); Lu Wang, Yulin (CN); Shijie Tang, Beijing (CN); Xuedong Kan, Jiaozuo (CN); Chao Yu, Beijing (CN); Han Bao, Beijing (CN)

(73) Assignee: CHINA UNIVERISTY OF MINING AND TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 18/346,104

(22) Filed: Jun. 30, 2023

(65) Prior Publication Data
US 2024/0141783 A1     May 2, 2024

(30) Foreign Application Priority Data

Oct. 27, 2022    (CN) .......................... 202222851760.6

(51) Int. Cl.
| | |
|---|---|
| *E21B 47/11* | (2012.01) |
| *E21B 33/124* | (2006.01) |
| *E21C 39/00* | (2006.01) |
| *E21F 16/00* | (2006.01) |

(52) U.S. Cl.
CPC .......... *E21C 39/00* (2013.01); *E21B 33/1243* (2013.01); *E21B 47/11* (2020.05); *E21F 16/00* (2013.01)

(58) Field of Classification Search
CPC .... E21B 33/1243; E21B 47/11; E21B 43/006; E21F 16/00
See application file for complete search history.

(56) References Cited

U.S. PATENT DOCUMENTS

| | | | | |
|---|---|---|---|---|
| 6,123,394 A | * | 9/2000 | Jeffrey | ..................... E21C 41/16 166/308.1 |
| 9,869,178 B2 | * | 1/2018 | Qin | ....................... E21F 15/005 |

* cited by examiner

*Primary Examiner* — Catherine Loikith
(74) *Attorney, Agent, or Firm* — Westbridge IP LLC (57) ABSTRACT

A tracer diffusion device includes: a first container, a second container, a drilling pipe, a unidirectional driving device, and a bidirectional driving device. The first container holds a first fluid containing a tracer. The second container holds a second fluid. A first end of the drilling pipe is connected to the first container; a second end of the drilling pipe is extended into a borehole and equipped with a first sealing capsule and a second sealing capsule. A plurality of through holes are arranged on the drilling pipe between the first sealing capsule and the second sealing capsule. The unidirectional driving device is arranged on the drilling pipe, for injecting the first fluid from the first container into the borehole between the first sealing capsule and the second sealing capsule. The bidirectional driving device is arranged between the second container and the first sealing capsule.

14 Claims, 3 Drawing Sheets

TRACER DIFFUSION DEVICE, SYSTEM FOR TRACING DEVELOPMENT OF WATER CONDUCTING FRACTURE ZONE AND RELATAED METHOD

CROSS-REFERENCE TO RELATED APPLICATIONS

This application claims priority to Chinese Patent Application No. 202222851760.6, filed on Oct. 27, 2022, the content of which is incorporated herein by reference in its entirety.

TECHNICAL FIELD

The present application relates to a technical field of coal mining protections, and in particular to a tracer diffusion device, a system for tracing a development of a water conducting fracture zone and related methods.

BACKGROUND

In a process of coal mining, it is inevitable to cause damages to overlying strata. When the overlying strata of a coal seam roof are damaged and water conducting fracture zones develop into an upper aquifer, the aquifer may serve as a water source, and the water conducting fracture zones may serve as water conducting channels to connect the water source to the coal seam. Apparently, the water conducting fracture zones become an important factor that seriously threatens the safety of mines. Therefore, tracing developments of water conducting fracture zones is of great significance for determining whether deep coal seam mining can be carried out safely and preventing water inrush from the roof of a working face.

In some studies, tracer diffusion experiments are used to determine developments of water conducting fracture zones. In these experiments, different tracers can be injected into different aquifers, therefore, the developments of water conducting fracture zones can be determined by monitoring types and concentrations of the tracers in fluids flowing into a goaf of a mine.

Specifically, in a tracer diffusion experiment, it is necessary to add a tracer after drilling a borehole to a target aquifer. However, directly adding the tracer into an opening of the borehole has a poor diffusion effect. In some experiments, water containing the tracer may be added into the target aquifer through an outlet of a tracer diffusion device which is injected into the target aquifer to improve the diffusion effect. However, due to a deep burial and a high pressure of the target aquifer, when the tracer is applied to the target aquifer, it may flow out of the borehole with a rising water flow. Apparently, this may cause waste. Moreover, the accuracy of the experiment may also be reduced.

Some other tracer diffusion devices may set a plug at an upper end of the water outlet to block the borehole to prevent tracers from flowing out of the borehole. However, there are usually multiple aquifers above the coal seam. Moreover, different tracers need to be applied to different aquifers. An existing tracer diffusion device may first drill to a first target aquifer, and add a first tracer to the first target aquifer. Then, the tracer diffusion device may continue to drill to a second target aquifer, and add a second tracer to the second target aquifer. Apparently, it is not only a time-consuming but also a labor-intensive process. Moreover, the first tracer may also flow into the second target aquifer along the borehole, which may also reduce the accuracy of the experiment.

Therefore, there is an urgent need for a tracer diffusion device which can diffuse a specified tracer to a specified aquifer easily and accurately.

SUMMARY

Examples of the present disclosure provide a tracer diffusion device, a system for tracing the development of a water conducting fracture zone and related methods to solve the above problems.

The tracer diffusion device according to examples of the present disclosure may be applied to a coal seam. The coal seam may include a goaf. And there may be a plurality of aquifers above the goaf. Moreover, there may be a borehole that penetrates each of the plurality of aquifers above the goaf.

Specifically, the tracer diffusion device may include: a first container, a second container, a drilling pipe, a unidirectional driving device, and a bidirectional driving device. The first container is used for holding a first fluid containing a tracer. The second container is used for holding a second fluid. A first end of the drilling pipe is connected to the first container, and a second end of the drilling pipe is extended into the borehole. Moreover, the second end of the drilling pipe is equipped with a first sealing capsule and a second sealing capsule. Wherein, the first sealing capsule is used to seal a first space above a target aquifer. The second sealing capsule is used to seal a second space below the target aquifer. The first sealing capsule is connected to the second container. A plurality of through holes are arranged on the drilling pipe between the first sealing capsule and the second sealing capsule. The unidirectional driving device is arranged on the drilling pipe for injecting the first fluid from the first container into the borehole between the first sealing capsule and the second sealing capsule to diffuse the tracer into the target aquifer. The bidirectional driving device is arranged between the second container and the first sealing capsule, for injecting the second fluid from the second container into the first sealing capsule and the second sealing capsule to make the first sealing capsule and the second sealing capsule expand and block the borehole; or, for extracting the second fluid from the first sealing capsule and the second sealing capsule back into the second container to make the first sealing capsule and the second sealing capsule to contract and separate from the borehole.

The system for tracing a development of a water conducting fracture zone may include a tracer diffusion device as described above; a coal seam, which includes a goaf; a plurality of aquifers above the coal seam; a borehole, drilled from above the goaf downward through the plurality of aquifers; a collection device, connected to the goaf for collecting fluids within the goaf; and a monitoring device, located near the collection device, for monitoring tracers in the fluids.

The method of tracer diffusion may comprise: placing a second end of a drilling pipe of a tracer diffusion device into a designated depth of a target aquifer; expanding a first sealing capsule and a second sealing capsule set on the second end of the drilling pipe in a borehole under a control of a bidirectional driving device of the tracer diffusion device to block the borehole; injecting a first fluid from a first container of the tracer diffusion device into the target aquifer through the drilling pipe under a control of a unidirectional driving device of the tracer diffusion device; and contracting the first sealing capsule and the second sealing capsule in the borehole under the control of the bidirectional driving device.

It can be seen from the above tracer diffusion device, the system for tracing a development of a water conducting fracture zone and the method of tracer diffusion, by setting up a first container for holding the first fluid containing the tracer, it provides a basis for diffusing the tracer to a designated aquifer. Further, by setting a second container to hold the second fluid, it provides a foundation for expanding or contracting the first sealing capsule and the second sealing capsule. Moreover, by setting the first end of the drilling pipe to be connected to the first container and the second end to extend into the borehole, the first fluid may be guided by the drilling pipe to flow into the borehole. And, by installing the first sealing capsule and the second sealing capsule on the drilling pipe, the first space above an aquifer where the borehole is located can be sealed by the first sealing capsule, and the second space below the aquifer can be sealed by the second sealing capsule. In this way, a closed space corresponding to the aquifer can be formed between the first sealing capsule and the second sealing capsule. This closed space can prevent water flows flowing from the aquifer to other areas. Further, this closed space can also prevent water from other aquifers flowing along the borehole into the aquifer. That is, mutual interferences between the aquifers can be avoided, and thus the accuracy of diffusion experiments can be improved.

Further, there are a plurality of through holes on the drilling pipe located between the first sealing capsule and the second sealing capsule. Through these through holes, the first fluid can flow from the first container into the aquifer, therefore the diffusion of the tracer in the aquifer can be detected. In this way, wastes of the tracer can be avoided and the accuracy of the diffusion experiment can be further improved.

Moreover, by setting up a connection between the first sealing capsule and the second sealing capsule can enable the first sealing capsule and the second sealing capsule to expand or contract synchronously to improve an efficiency of the tracer diffusion device. By setting up a connection between the first sealing capsule and the second container can guide the second fluid to enter or leave the first sealing capsule and the second sealing capsule, which will make the first sealing capsule and the second sealing capsule expand or contract so as to block or be separated from the borehole.

A unidirectional driving device is set up to inject the first fluid inside the first container into the borehole between the first sealing capsule and the second sealing capsule, in order to diffuse the tracer to the aquifer. A bidirectional driving device is set up to inject the second fluid inside the second container into the first sealing capsule and the second sealing capsule, so as to expand the first sealing capsule and the second sealing capsule to block the borehole, or to pump the second fluid inside the first sealing capsule and the second sealing capsule back into the second container, so that the first sealing capsule and the second sealing capsule may contract and separate from the borehole. In this state, the tracer diffusion device may move freely. Since two sealing capsules are used, a single borehole drilled through multiple aquifers can be used, and different tracers can be diffused into different aquifers separately. One tracer will enter the aquifer from a position between the two sealing capsules, and there would be no interferences between tracers in different aquifers. Therefore, the tracer diffusion experiment can be carried out with a higher accuracy, and the process is time-saving and labor-saving.

It can be seen that the tracer diffusion device and system have a simple structure and perform simple operations. Further, by the tracer diffusion device and the system, different tracers can be diffused into different aquifers easily and accurately. Not only time and effort can be saved, but also the accuracy of the tracer diffusion experiment can be improved. Moreover, a basis for judging developments of water conducting fracture zones can be provided.

BRIEF DESCRIPTION OF THE DRAWINGS

In order to describe the technical solutions in one or more examples of the present disclosure or the prior art more clearly, the following briefly introduces accompanying drawings for describing the examples or the prior art. Apparently, the accompanying drawings in the following description show only the examples of the present disclosure, and those of ordinary skill in the art may still derive other drawings from these drawings without any creative efforts.

DETAILED DESCRIPTION OF THE EMBODIMENTS

To make the objectives, technical solutions and advantages of the present disclosure clearer, the present disclosure will be further described in detail below in conjunction with specific examples and with reference to the accompanying drawings.

It should be noted that, unless otherwise defined, technical terms or scientific terms used in one or more examples of the specification should have the ordinary meanings as understood by those of ordinary skill in the art to which the present disclosure belongs. The terms "first", "second" and similar words used in one or more examples of the specification do not denote any order, quantity, or importance, but are merely used to distinguish different components. The terms "including" or "comprising" and the like are intended to indicate that elements or objects in front of the word encompass elements or objects listed after the word and their equivalents, but do not exclude another element or object. Similar terms such as "connected" or "linked" are not limited to physical or mechanical connections, but may include electrical connections, whether direct or indirect. The terms "upper", "lower", "left", "right" and the like are only used to represent a relative positional relationship, and when an absolute position of a described object changes, the relative positional relationship may also change accordingly.

As described above, in the process of coal mining, it is inevitable to cause damages to overlying strata and a goaf may be formed after coal mining. The goaf may cause the overlying rocks of a coal seam roof to lose support. Damages, movements, or fractures of the overlying strata may occur. Through a combined action of self-weight stress and stress of surrounding strata, the stress in the overlying strata of the roof may undergo a redistribution. In this process, curved subsidence zones, fractured zones, and caving zones may be formed. The caving zones and the fractured zones can be called as water conducting fracture zones. When a water conducting fracture zone develops into an upper aquifer, the aquifer may serve as a water source, and the water conducting fracture zone may serve as a water conducting channel to connect the water source to the coal seam. Apparently, the water conducting fracture zone becomes an important factor that seriously threatens the safety of mines. Therefore, tracing developments of water conducting fracture zones is of great significance for determining whether deep coal seam mining can be carried out safely and preventing water inrush from the roof of a working face.

Conventional methods for tracing a development of a water conducting fracture zone may include numerical simulation methods, similar physical simulation experiments, and on-site drilling observation methods. Numerical simulation methods are relatively abstract and often simplify boundary conditions and element attributes, which may have a certain impact on the accuracy of analysis results. Similar physical simulation experiments are limited by experimental materials and methods, and cannot reproduce geological structures and physical and mechanical characteristics accurately under different geological conditions. The on-site drilling observation methods are susceptible to influences of original fractures in the strata, and cannot detect an actual height of the development of the water conducting fracture zone. In some studies, tracer diffusion experiments are used to determine developments of water conducting fracture zones. In these experiments, different tracers can be injected into different aquifers and the developments of water conducting fracture zones can be determined by monitoring types and concentrations of the tracers in the fluid of a goaf of a mine. For example, when a tracer in a corresponding aquifer is detected, it can be determined that the water conducting fracture zone has developed into the corresponding aquifer. When a concentration of a certain tracer is detected to be high, it can be determined that a conductivity of the water conducting fracture zone connecting the corresponding aquifer becomes greater. It can be seen that through the above method a more accurate understanding of the development of the water conducting fracture zone can be obtained.

Specifically, in a tracer diffusion experiment, it is necessary to add a tracer after drilling a borehole to a target aquifer. However, directly adding the tracer into an opening of the borehole has a poor diffusion effect. In some experiments, water containing the tracer may be added into the target aquifer through an outlet of a tracer diffusion device which is injected into the target aquifer to improve the diffusion effect. However, due to a deep burial and a high pressure of the target aquifer, when the tracer is applied to the target aquifer, it may flow out of the borehole with a rising water flow which may cause wastes. Moreover, an accuracy of the experiment may also be reduced. Some other tracer diffusion devices may set a plug at an upper end of the water outlet to block the borehole and to prevent tracers from flowing out of the borehole. However, there are usually multiple aquifers above the coal seam. Moreover, different tracers need to be applied to different aquifers. An existing tracer diffusion device may first drill to a first target aquifer, and add a first tracer to the first target aquifer. Then, the tracer diffusion device may continue to drill to a second target aquifer, and add a second tracer to the second target aquifer. Apparently, it is not only a time-consuming but also a labor-intensive process. Moreover, the first tracer may also flow into the second target aquifer along the borehole, which may also reduce the accuracy of the experiment. Therefore, there is an urgent need for a tracer diffusion device which can diffuse a specified tracer to a specified aquifer easily and accurately.

Examples of the present disclosure provide a tracer diffusion device and a system for tracing a development of a water conducting fracture zone to solve the above problems.

Before describing specific examples of the present disclosure, reference numerals in the drawings are introduced at first.

In the drawings of the present disclosure, reference number 1 refers to a coal seam; reference number 1-1 refers to a goaf of the coal seam; reference number 2 refers to any one of a plurality of aquifers above the goaf; reference number 3 refers to a borehole; reference number 4 refers to a first container; reference number 5 refers to a second container; reference number 6 refers to a drilling pipe; reference number 6-1 refers to any one of a plurality of through holes on the drilling pipe; reference number 6-2 refers to a limit disk; reference number 7 refers to a first sealing capsule; reference number 8 refers to a second sealing capsule; reference number 9 refers to a unidirectional drive device; reference number 10 refers to a bidirectional drive device; reference number 11 refers to a first valve; reference number 12 refers to a first pressure gauge; reference number 13 refers to a first flow meter; reference number 14 refers to a second valve; reference number 15 refers to a second pressure gauge; reference number 16 refers to a second flow meter; reference number 17 refers to a control unit; reference number 18 refers to a closed wall; reference number 19 refers to a water storage tank; reference number 20 refers to a tracer detection probe; reference number 21 refers to a data recorder; reference number 22 refers to a protection housing.

Figure 1:
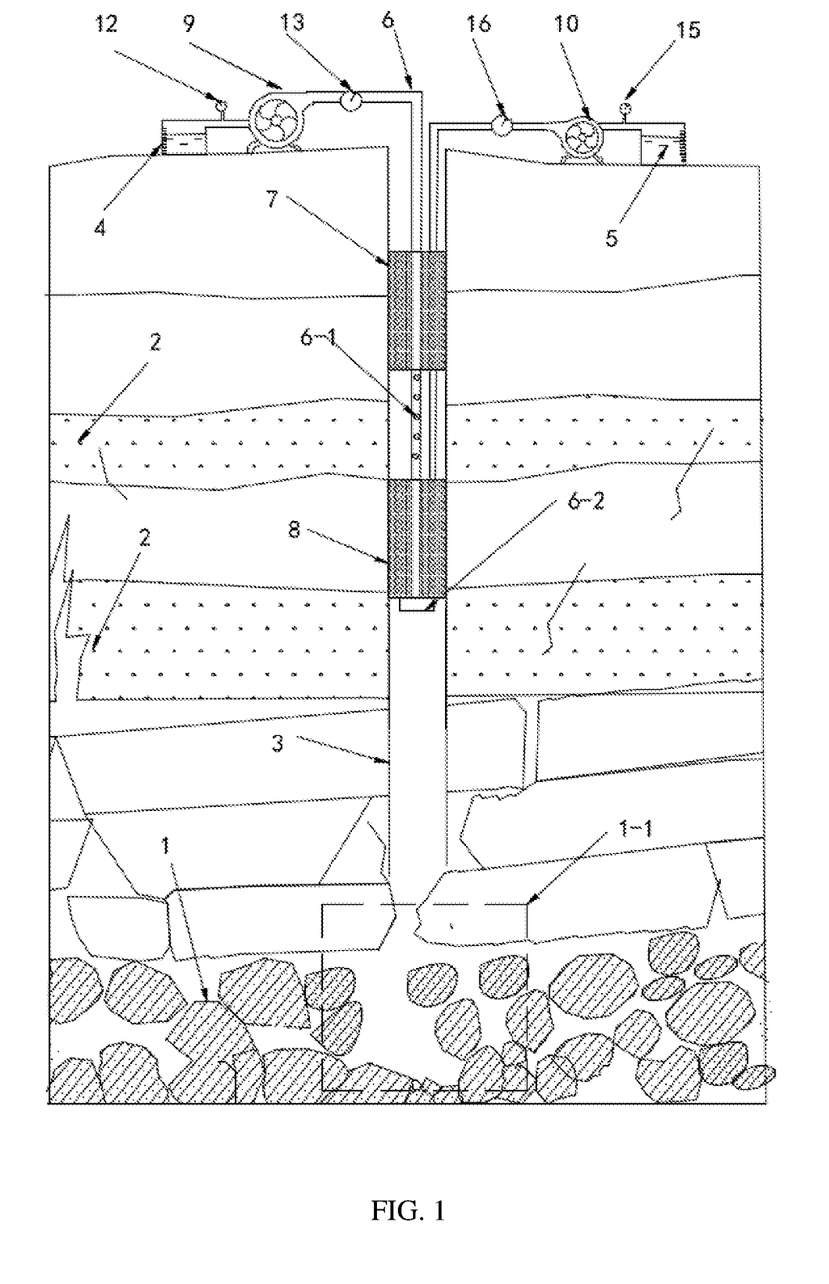
FIG. 1 is a schematic diagram illustrating a structure of a tracer diffusion device according to some examples of the present disclosure.

Examples of the present disclosure provides a tracer diffusion device. FIG. 1 is a schematic diagram illustrating a structure of a tracer diffusion device according to some examples of the present disclosure. As illustrated in FIG. 1, The tracer diffusion device according to examples of the present disclosure may be applied to a coal seam 1. The coal seam 1 may include a goaf 1-1. And there may be a plurality of aquifers 2 above the goaf 1-1. Moreover, there may also be a borehole 3 above the goaf 1-1. The borehole 3 may be a vertical borehole and the borehole 3 may drilled through or penetrate each of the plurality of aquifers 2.

As illustrated in FIG. 1, the tracer diffusion device may include: a first container 4, a second container 5, a drilling pipe 6, a unidirectional driving device 9, and a bidirectional driving device 10.

The first container 4 is used for holding a first fluid containing a tracer.

The second container 5 is used for holding a second fluid.

A first end, such as a top end, of the drilling pipe 6 is connected to the first container 4, and a second end, such as a bottom end, of the drilling pipe 6 is extended into the borehole 3. Moreover, the second end of the drilling pipe 6 is equipped with a first sealing capsule 7 and a second sealing capsule 8. The first sealing capsule 7 and the second sealing capsule 8 are set on the drilling pipe 6 with an interval as sleeves. Wherein, the first sealing capsule 7 is used to seal a first space above an aquifer 2. The second sealing capsule 8 is used to seal a second space below the aquifer 2. The first sealing capsule 7 is connected to the second container 5. The second sealing capsule 8 is connected to the first sealing capsule 7. Alternatively, the second sealing capsule may be connected to the second container 5 as the first sealing capsule 7. A plurality of through holes 6-1 are arranged on the drilling pipe 6 between the first sealing capsule 7 and the second sealing capsule 8.

The unidirectional driving device 9 is arranged on the drilling pipe 6 for injecting the first fluid from the first container 4 into the borehole 3 between the first sealing capsule 7 and the second sealing capsule 8 through the drilling pipe 6 to diffuse the tracer to the aquifer 2.

The bidirectional driving device 10 is arranged between the second container 5 and the first sealing capsule 7, for injecting the second fluid from the second container 5 into the first sealing capsule 7 and the second sealing capsule 8 to make the first sealing capsule 7 and the second sealing capsule 8 expand and block the borehole 3; or, for extracting the second fluid from the first sealing capsule 7 and the second sealing capsule 8 back into the second container 5 to make the first sealing capsule 7 and the second sealing capsule 8 to contract and separate from the borehole 3.

By setting up the first container 4 for holding the first fluid containing the tracer, it provides a basis for diffusing the tracer to a designated aquifer. By setting the second container 5 to hold the second fluid, it provides a foundation for expanding or contracting the first sealing capsule 7 and the second sealing capsule 8. Specifically, in some examples of the present disclosure, the first container 4 and the second container 5 may be water tanks. The first fluid and the second fluid may be water. The tracer may be a fluorescent tracer. There are no specific restrictions. Further, the first container 4 and the second container 5 may be equipped with scales to indicate changes on a volume of the fluid inside.

By setting the first end of the drilling pipe 6 to be connected to the first container 4 and the second end to extend into the borehole 3, the first fluid may be guided through the drilling pipe 6 to flow into the borehole.

By installing the first sealing capsule 7 and the second sealing capsule 8 on the drilling pipe, the first space above the aquifer 2 where the borehole 3 is located can be sealed by the first sealing capsule 7, and the second space below the aquifer 2 can be sealed by the second sealing capsule 8. In this way, a closed space corresponding to the aquifer 2 can be formed between the first sealing capsule 7 and the second sealing capsule 8. This closed space can prevent water flows flowing from the aquifer 2 to other areas. Further, this closed space can also prevent water from other aquifers flowing along the borehole 3 to the aquifer 2. That is, mutual interferences between different aquifers can be avoided, and thus the accuracy of diffusion experiments can be improved. Specifically, in some examples of the present disclosure, rubber can be used as materials of the first sealing capsule 7 and the second sealing capsule 8. However, there are no specific restrictions on the materials used.

Further, there are a plurality of through holes 6-1 on the drilling pipe 6 between the first sealing capsule 7 and the second sealing capsule 8. Through these through holes 6-1, the first fluid can flow into the aquifer 2, therefore the tracer can be diffused into the aquifer 2. In this way, wastes of the tracer can be avoided and the accuracy of the diffusion experiment can be further improved.

By setting up a connection, such as a high pressure hose connection, between the first sealing capsule 7 and the second sealing capsule 8 can enable the first sealing capsule and the second sealing capsule to expand or contract synchronously to improve an efficiency of the tracer diffusion device. By setting up a connection between the first sealing capsule 7 and the second container 5 can guide the second fluid to enter or leave the first sealing capsule 7 and the second sealing capsule 8, which will make the first sealing capsule and the second sealing capsule expand or contract.

A unidirectional driving device 9, such as a pump, is set up to inject the first fluid inside the first container 4 into the borehole 3 between the first sealing capsule 7 and the second sealing capsule 8 through the drilling pipe 6, in order to diffuse the tracer to the aquifer 2.

A bidirectional driving device 10, such as a reversing pump, is set up to inject the second fluid inside the second container 5 into the first sealing capsule 7 and the second sealing capsule 8, so as to expand the first sealing capsule 7 and the second sealing capsule 8 to block the borehole 3, or to pump the second fluid inside the first sealing capsule 7 and the second sealing capsule 8 back into the second container 5, so that the first sealing capsule 7 and second sealing capsule 8 may contract and separate from the borehole 3. When the first sealing capsule 7 and second sealing capsule 8 separate from the borehole 3, the tracer diffusion device may move freely along the borehole 3.

Since two sealing capsules are used, a single borehole 3 drilled through multiple aquifers 2 can be used, and different tracers can be diffused into different aquifers 2 separately. For example, the tracer diffusion device may move along the borehole 3 from bottom to top and diffuse different tracers into different aquifers 2 respectively. One tracer will enter the aquifer 2 from a position between the two sealing capsules, and there would be no interferences between tracers in different aquifers 2. Therefore, the tracer diffusion experiment can be carried out with a higher accuracy. Moreover, by using this tracer diffusion device, tracers with different optical characteristics can be quantitatively and pressurized and diffused into their corresponding aquifers 2 in the same borehole 3 and the tracer can be fully dispersed in the aquifer 2. As illustrated, the process is time-saving and labor-saving.

It can be seen that the tracer diffusion device has a simple structure and can perform simple operations. Further, by the tracer diffusion device, different tracers can be diffused into different aquifers easily and accurately. Not only time and effort can be saved, but also the accuracy of the tracer diffusion experiment can be improved. Moreover, a basis for judging developments of water conducting fracture zones can be provided.

Figure 2:
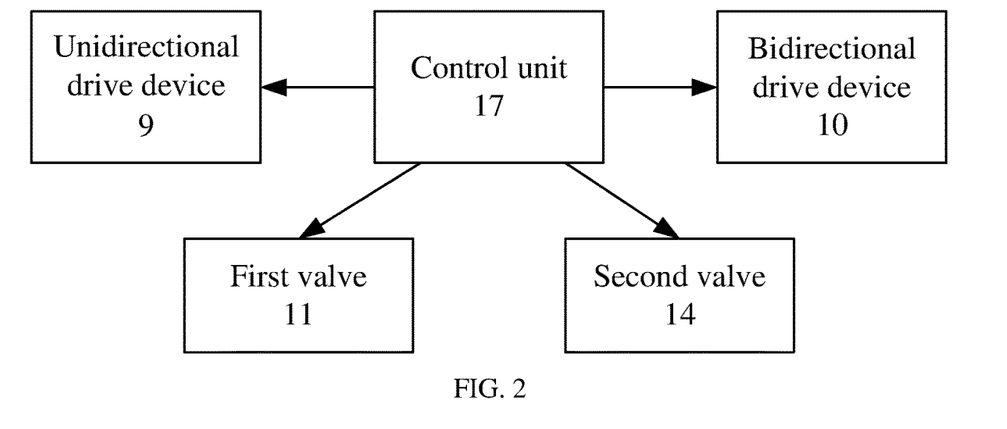
FIG. 2 is a schematic diagram illustrating connections between modules of a tracer diffusion device according to some examples of the present disclosure.

FIG. 2 is a schematic diagram illustrating connections between modules of a tracer diffusion device according to some examples of the present disclosure. In some examples of the present disclosure, as shown in FIG. 1 and FIG. 2, the drilling pipe 6 is also equipped with a first valve 11, a first pressure gauge 12, and a first flow meter 13. The bottom of the drilling pipe 6, such as the second end of the drilling pipe 6, is further equipped with a limit disc 6-2. Moreover, a second valve 14, a second pressure gauge 15, and a second flow meter 16 are connected between the second container 5 and the first sealing capsule 7.

For example, the first valve 11 may be a one-way solenoid valve to avoid a reverse flow of the first fluid, thereby avoiding a reverse flow of the tracer. Moreover, the first valve 11 may control the drilling pipe 6 open or close. The first pressure gauge 12 is used to monitor a pressure of the first fluid. The first flow meter 13 is used to monitor a flow rate of the first fluid. Through the pressure and flow rate of the first fluid, it is easy to determine whether the tracer is fully diffused.

The second valve 14 may be an electromagnetic valve that controls a connection between the second container 5 and the first sealing capsule 7. The second pressure gauge 15 is used to monitor a pressure of the second fluid. The second flow meter 16 is used to monitor a flow rate of the second fluid. Through the pressure and the flow rate, it is easy to determine a degree of expansion or contraction of the sealing capsules.

By setting the limit disc 6-2, a position of the second sealing capsule 8 can be limited. Further, a clamp can be set on the drilling pipe 6 below the first sealing capsule 7 to limit the position of the first sealing capsule 7. In some examples of the present disclosure, the clamp can be detachably connected to the drilling pipe 6. The first sealing capsule 7 is set on the drilling pipe 6 like a sleeve. By adjusting the position of the clamp and the first sealing capsule 7, the distance between the first sealing capsule 7 and the second sealing capsule 8 can be adjusted to match a thickness of an aquifer 2 better.

In some examples, as shown in FIG. 2, the tracer diffusion device may further include a control unit 17. The control unit may be electrically connected to the unidirectional driving device 9, the bidirectional driving device 10, the first valve 11, and the second valve 14 respectively to control the flow of the first fluid and the second fluid. For example, the model of the control unit 17 may be G120.

Some other examples of the present disclosure provide a system for tracing a development of a water conducting fracture zone.

Figure 3:
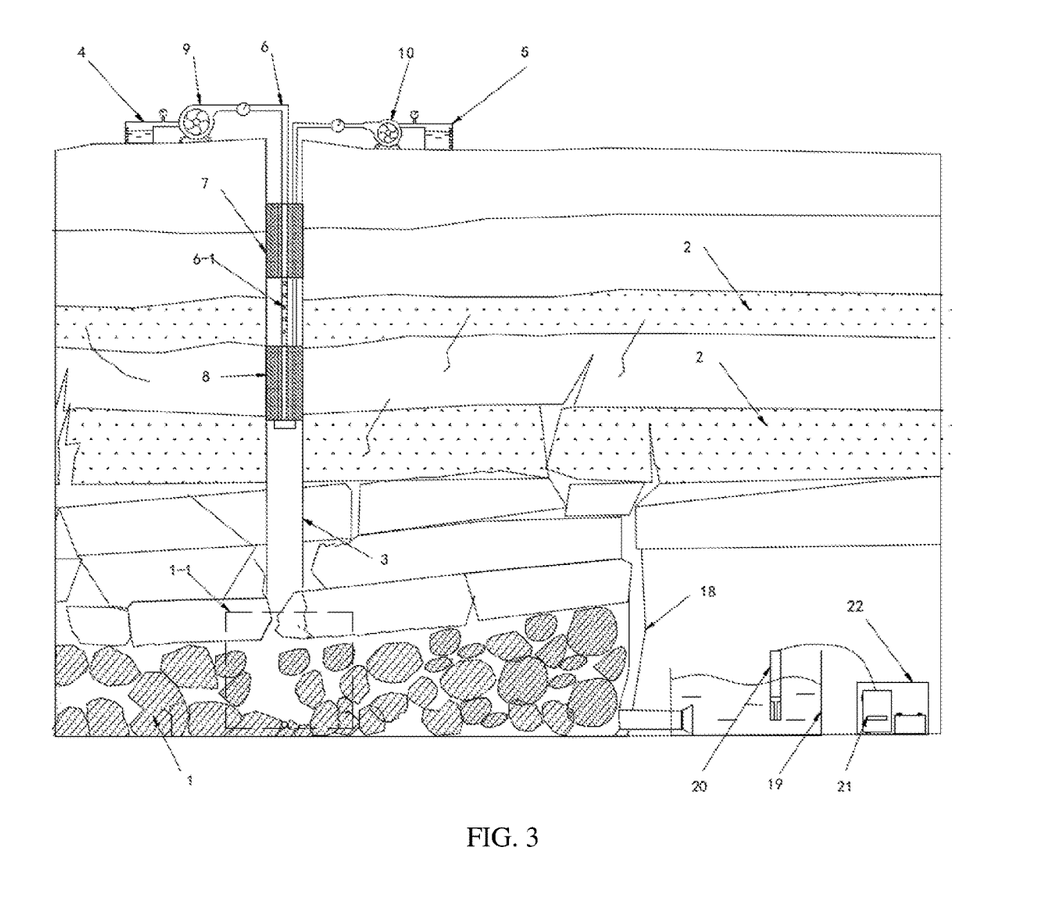
FIG. 3 is a schematic diagram illustrating a structure of a system for tracing development of a development of a water conducting fracture zone according to some examples of the present disclosure.

FIG. 3 is a schematic diagram illustrating a structure of a system for tracing development of a development of a water conducting fracture zone according to example of the present disclosure. As shown in FIG. 3, the system may include a tracer diffusion device as described in any of the previous examples. The system may further include a coal seam 1, a plurality of aquifers 2, a borehole 3, a collection device and a monitoring device. In some examples of the present disclosure, the coal seam 1 may include a goaf 1-1. The plurality of aquifers 2 may locate above the coal seam 1. The borehole 3 may also locate above the goaf 1-1. Moreover, the borehole 3 may run through each of the plurality of aquifers 2.

The collection device may be connected to the goaf 1-1 and may be used to collect fluids in the goaf 1-1. The fluids in goaf 1-1 may include a part of or the entire of the first fluid injected into the plurality of aquifers 2. The composition of the fluids varies depending on the development of the water conducting fracture zones.

The monitoring device may locate near the collection device and may be used for monitoring the tracer in the fluids. Specifically, by analyzing the types and concentrations of tracers in the fluids, the developments of the water conducting fracture zones can be determined. For example, when a tracer in a corresponding aquifer 2 is detected, it can be determined that a water conducting fracture zone has developed into the corresponding aquifer 2. Moreover, when the concentration of a specific tracer is detected to be high, it can be determined that the conductivity of the water conducting fracture zone connecting the corresponding aquifer 2 becomes greater. In this way, the developments of the water conducting fracture zones can be determined accurately.

In some examples, as shown in FIG. 3, a periphery of the goaf 1-1 may be equipped with a closed wall 18. Moreover, the collection device may further include a water storage tank 19. The water storage tank 19 may be connected to the bottom of the closed wall 18 to accommodate the fluids. The closed wall 18 is used to protect the coal seam 1. The size of the water storage tank 19 is, for example, 1 m*1 m*2 m. However, there is no specific limits on the size of the water storage tank 19.

In some examples, the water storage tank 19 may be connected to a mine drainage system of the coal seam 1. By connecting the water storage tank 19 to the mine drainage system of the coal seam 1, the fluids in the water storage tank 19 may be enabled to be discharged, therefore, the developments of the water conducting fracture zones can be monitored dynamically. Additionally, redundant fluids can be discharged through the mine drainage system to avoid overflowing from the water storage tank 19.

In some examples, a third valve can be set between the water storage tank 19 and the closed wall 18, and a fourth valve can be set between the water storage tank 19 and the mine drainage system. For example, the third valve and the fourth valve can both be one-way valves. In these examples, the third valve is used to control the connection between the water storage tank 19 and the goaf 1-1 and the fourth valve is used to control the connection between the water storage tank 19 and the mine drainage system to facilitate experiments.

In some examples, as shown in FIG. 3, the monitoring device may include a tracer detection probe 20, which is set inside the water storage tank 19. The tracer detection probe 20, for example, can be an optical probe. Since the tracer detection probe 20 is set in the water storage tank 19, optical signals can be obtained while detecting the tracers in the fluids. The monitoring device may also include a data recorder 21. The data recorder 21 can be electrically connected to the tracer detection probe 20 and is used for collecting signals, converting signals, and analyzing the development of a water conducting fracture zone. The optical signals detected by the tracer detection probe 20 can be transmitted to the data recorder 21. Then the optical signals can be converted to data such as types of tracers detected and concentrations of the tracers detected by the data recorder 21. A model of the data recorder 21 can be HC-100D. However, there is no specific limits on the model of the data recorder 21.

In some examples, as shown in FIG. 3, the data recorder 21 can be externally equipped with a protection housing 22. The protection housing 22 is equipped with an external interface to connect the data recorder 21 to an underground power source to maintain a working electricity of the data recorder 21. The protection housing 22 can protect the data recorder 21 from moisture and explosion, making a long-term underground use possible for the data recorder 21. Further, the protection housing 22 can be equipped with a backup battery to ensure that the system can work underground for a longer time.

Figure 4:
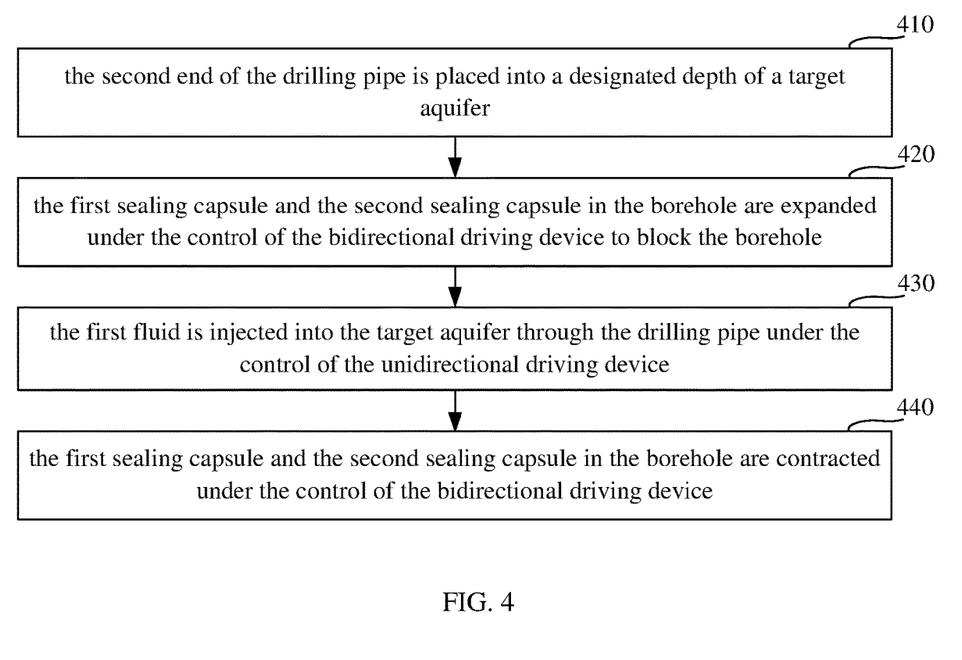
FIG. 4 is a flowchart illustrating a method of tracer diffusion according to some examples of the present disclosure.

Based on the tracer diffusion device and the system for tracing a development of a water conducting fracture zone disclosed above, examples of the present disclosure also provide a method of tracer diffusion. FIG. 4 is a flowchart illustrating the method of tracer diffusion according to some examples of the present disclosure. As shown in FIG. 4, the method of tracer diffusion may include the following steps.

In step 410, the second end of the drilling pipe 6 is placed into a designated depth of a target aquifer 2.

For the first time to inject a tracer, the target aquifer 2 would be the deepest aquifer 2 in the borehole. For a next time to inject a tracer, the target aquifer 2 would be an upper aquifer 2 above and next to a previous target aquifer 2.

In step 420, the first sealing capsule 7 and the second sealing capsule 8 in the borehole 3 are expanded under the control of the bidirectional driving device 10 to block the borehole 3.

In step 430, the first fluid is injected into the target aquifer 2 through the drilling pipe 6 under the control of the unidirectional driving device 9.

In this process, the tracer in the first fluid can be injected and diffuse in the target aquifer 2.

To be noted, the amount of the tracer in the first fluid would be set according to an estimated amount. In some examples, the estimated amounts of tracers to be injected can be determined based on hydrogeological parameters and lengths of flow paths of a mine. Specifically, the hydrogeological parameters may include water abundance and permeability coefficient of each of the plurality of aquifers 2. In some examples, after a construction of a borehole 3 is completed, background values may be measured for water samples from each group of tracer injection points and each water tank detection point on the working face to obtain the hydrogeological parameters and the lengths of flow paths of the mine.

Moreover, in this process, the first flow meter 13 may record the flow rate of the first fluid injected, and the first pressure gauge 12 may monitor the pressure of the first fluid in real time.

In some examples of the present disclosure, after injecting the first fluid, clean water may be added into the first container 4 according to actual situations on site, and the clean water may be injected into the target aquifer 2 under the control of the unidirectional driving device 9 to ensure that the tracer can be fully injected into the designated aquifer 2.

In step 440, the first sealing capsule 7 and the second sealing capsule 8 in the borehole 3 are contracted under the control of the bidirectional driving device 10.

By the above process, a tracer corresponding to the target aquifer 2 can be fully injected in to the target aquifer 2.

Since there would be multiple aquifers 2 above the goaf 1-1, the tracer diffusion device would further be used to inject different tracers in different aquifers 2.

In this aspect, the method may further include: the tracer diffusion device is moved to a depth of a next target aquifer 2 using the drilling pipe 6. Then proceeds to step 420, until the tracer diffusion device is moved to the top of the borehole. To be noted, in order to inject different tracers into different aquifers, when the tracer diffusion device is moved to the depth of the next target aquifer 2, a new tracer corresponding to the next target aquifer 2 should be added into the first container. As stated above, the amount of the new tracer added can refer to the estimated amount of the tracers to be injected determined previously.

Specifically, in some examples of the present disclosure, the next target aquifer 2 is the aquifer above and next to the previous target aquifer 2. After the tracer diffusion device is moved to the depth of the next target aquifer 2, the next aquifer 2 would be taken as the target aquifer 2 in the following process.

It can be seen that, by repeating the above process, different tracers can be injected into the plurality of aquifers 2 from bottom to top one by one.

After the injection of the tracers, the tracers in different aquifers 2 may migrate through the water channels formed in the coal seam 1 as groundwater flows. After a period of time, groundwater with different fluids may flow into the water storage tank 19 in the goaf 1-1 of the underground working face. To be noted, the third valve should be opened at first, thus the fluids may flow into the water storage tank 19.

Then, the fluids in the water storage tank 19 may be detected by the tracer detection probe 20. Optical signals detected would be then transmitted to the data recorder 21.

In examples of the present disclosure, the tracer detection probe 20 may be electrically connected to the data recorder 21, therefore, the data recorder 21 may set time intervals of sampling of the tracer detection probe 20.

After receiving the optical signals, a type, quantity, and concentration of each tracer detected in the fluids would be analyzed by the data recorder 21. Further, the data recorder 21 may record the time of detection, the type, the quantity, and the concentration of each tracer detected on an internal storage card.

It should be noted that the method of tracer diffusion according to one or more examples of the present disclosure may be implemented by a single device, such as a computer or a server. The method may also be applied to a distributed scenario and may be completed by cooperations of a plurality of devices. In a case of the distributed scenario, one of the plurality of devices may merely implement one or more steps in the decoding method, and the plurality of devices may interact with each other to complete the decoding method.

It should be noted that, specific examples of the present disclosure have been described above. Other examples are within the scope of the appended claims. In some cases, the actions or steps recited in the claims can be performed in an order different from that in the examples, and can still achieve desired results. In addition, the processes depicted in the accompanying drawings are not necessarily required to be shown in a particular or sequential order, to achieve desired results. In some implementations, multi-task processing and parallel processing are also possible or may be advantageous.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A system for tracing a development of a water conducting fracture zone, comprising:
   a tracer diffusion device;
   a coal seam; wherein the coal seam comprises a goaf;
   a plurality of aquifers above the coal seam;
   a borehole, drilled from above the goaf downward through the plurality of aquifers;
   a collection device, connected to the goaf for collecting fluids within the goaf; and
   a monitoring device, located near the collection device, for monitoring the tracer in the fluids; wherein,
   the tracer diffusion device comprises:
   a first container, for holding a first fluid containing a tracer;
   a second container, for holding a second fluid;
   a drilling pipe; wherein a first end of the drilling pipe is connected to the first container; a second end of the drilling pipe is extended into a borehole drilled through a plurality of aquifers above the goaf; and the second end of the drilling pipe is equipped with a first sealing capsule and a second sealing capsule; the first sealing capsule is used to seal a first space above a target aquifer among the plurality of aquifers; the second sealing capsule is used to seal a second space below the target aquifer; the first sealing capsule is connected to the second container; a plurality of through holes are arranged on the drilling pipe between the first sealing capsule and the second sealing capsule;

a unidirectional driving device, arranged on the drilling pipe, for injecting the first fluid from the first container into the borehole between the first sealing capsule and the second sealing capsule to diffuse the tracer into the target aquifer; and a bidirectional driving device, arranged between the second container and the first sealing capsule, for injecting the second fluid from the second container into the first sealing capsule and the second sealing capsule to make the first sealing capsule and the second sealing capsule expand to block the borehole; or, for extracting the second fluid from the first sealing capsule and the second sealing capsule back into the second container to make the first sealing capsule and the second sealing capsule to contract.

2. The system according to claim 1, further comprising: a closed wall on a periphery of the goaf; wherein, the collection device further comprises a water storage tank; wherein the water storage tank is connected to a bottom of the closed wall to accommodate fluids.

3. The system according to claim 2, wherein, the water storage tank is connected to a mine drainage system of the coal seam.

4. The system according to claim 3, further comprising: a fourth valve, between the water storage tank and the mine drainage system.

5. The system according to claim 2, further comprising: a third valve, between the water storage tank and the closed wall.

6. The system according to claim 1, wherein, the monitoring device comprises a tracer detection probe, set inside the water storage tank.

7. The system according to claim 6, wherein, the monitoring device further comprises: a data recorder, electrically connected to the tracer detection probe.

8. The system according to claim 7, wherein, the data recorder comprises: a protection housing, equipped with an external interface to connect the data recorder to an underground power source.

9. The system according to claim 1, wherein, the second sealing capsule is connected to the second container.

10. The system according to claim 1, wherein, the second sealing capsule is connected to the first sealing capsule.

11. The system according to claim 1, wherein, the drilling pipe is equipped with a first valve, a first pressure gauge, and a first flow meter.

12. The system according to claim 11, wherein, a second valve, a second pressure gauge, and a second flow meter are connected between the second container and the first sealing capsule.

13. The system according to claim 12, further comprising: a control unit, electrically connected to the unidirectional driving device, the bidirectional driving device, the first valve, and the second valve.

14. The system according to claim 1, wherein, the second end of the drilling pipe is equipped with a limit disc.

* * * * *